US007554033B1

(12) United States Patent
Bhosale et al.

(10) Patent No.: US 7,554,033 B1
(45) Date of Patent: Jun. 30, 2009

(54) ENVIRONMENTALLY PROTECTED WIRING DEVICE

(75) Inventors: Vikramsinh Bhosale, Syracuse, NY (US); Dejan Radosavljevic, La Fayette, NY (US); Richard Weeks, Little York, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 27 days.

(21) Appl. No.: 11/677,208

(22) Filed: Feb. 21, 2007

Related U.S. Application Data

(63) Continuation-in-part of application No. 10/729,685, filed on Dec. 5, 2003, now Pat. No. 7,312,963.

(51) Int. Cl.
*H02G 3/18* (2006.01)

(52) U.S. Cl. .......................... 174/53; 174/58; 439/106; 439/107; 385/76; 361/42

(58) Field of Classification Search .................. 174/53, 174/58, 66, 67; 439/106, 107, 535, 137; 361/42-51, 115; 385/76, 92; 335/165-176; 220/241, 242
See application file for complete search history.

(56) References Cited

U.S. PATENT DOCUMENTS

| | | | | |
|---|---|---|---|---|
| 3,028,467 A | | 4/1962 | Hubbell | |
| 3,845,234 A | | 10/1974 | Brenner | |
| 4,265,365 A | * | 5/1981 | Boteler | 220/3.3 |
| 4,343,411 A | * | 8/1982 | Chesnut et al. | 220/242 |
| 4,484,021 A | * | 11/1984 | Schaefer et al. | 174/53 |
| 4,567,544 A | | 1/1986 | Ronemus et al. | |
| 4,794,207 A | * | 12/1988 | Norberg et al. | 174/505 |
| 5,239,129 A | * | 8/1993 | Ehrenfels | 174/51 |
| 5,712,450 A | | 1/1998 | Chan et al. | |
| 6,592,393 B1 | | 7/2003 | Gentle | |
| 6,624,990 B1 | | 9/2003 | Lortscher | |
| D513,734 S | | 1/2006 | Aromin | |
| 2006/0009059 A1 | | 1/2006 | Gentle | |

FOREIGN PATENT DOCUMENTS

| | | |
|---|---|---|
| GB | 2151859 | * 12/1983 |

* cited by examiner

*Primary Examiner*—Dhiru R Patel
(74) *Attorney, Agent, or Firm*—Daniel P. Malley; Bond, Schoeneck & King, PLLC

(57) ABSTRACT

The present invention is directed to an electrical wiring device for use in an ambient environment. The device includes a cover assembly characterized by a perimeter defining a user-accessible front face portion of the wiring device. The cover assembly includes at least one user-accessible control feature disposed therein. A body member is connected to the cover assembly. A circuit arrangement is disposed in the body member, at least a portion of the circuit arrangement being in operative communication with the at least one user-accessible control feature. A gasket structure is integrated into the cover assembly and disposed under the front face portion to substantially seal the circuit arrangement from the ambient environment. The gasket structure includes at least one gasket feature coupling the at least one user-accessible control feature and the at least a portion of the circuit arrangement. The gasket structure extends from the perimeter a predetermined distance to form a gasket perimeter defining an environmentally protected area. The environmentally protected area is greater than or substantially equal to a coverage area of a standard wall plate.

51 Claims, 7 Drawing Sheets

ENVIRONMENTALLY PROTECTED WIRING DEVICE

CROSS-REFERENCE TO RELATED APPLICATIONS

This is a continuation-in-part of U.S. patent application Ser. No. 10/729,685 filed on Dec. 5, 2003, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to electrical protection devices, and particularly to electrical protection devices with environmental protection features.

2. Technical Background

As those of ordinary skill in the art will understand, an electric circuit comprises many different electrical wiring devices disposed at various locations throughout a structure. These devices include outlet receptacles, which may be combined with other wiring devices such as switches, lighting devices and protective wiring devices. Ground fault circuit interrupters (GFCIs), and arc fault circuit interrupters (AFCIs) are examples of protective devices in electric circuits. Each of the aforementioned protective devices have interrupting contacts for breaking the connection between the line terminals and load terminals when the protective device detects a fault condition. The connection is broken to interrupt the load current and thereby remove the fault condition.

Fault conditions include those that result in risk electrocution of personnel, or fire. The outlet receptacles are disposed in duplex receptacles, decorator receptacles, raceway, multiple outlet strips, power taps, extension cords, light fixtures, appliances, and the like. Outlet receptacles may be configured for installation in outlet boxes. Once installed, a faceplate may be attached to the cover of the outlet receptacle or to the junction box to complete the installation.

Most of these devices have line terminals for connection to the power line, and load terminals for connection to a load. The load terminals include receptacle contacts, feed-thru terminals, or both. The receptacle contacts are configured to accommodate the blades of a plug connector, which are inserted to provide power to a load. Feed-thru terminals, on the other hand, are configured to accommodate wires which are connected to one or more additional receptacles, known as downstream receptacles. The downstream receptacles may include a string of downstream receptacles that comprise part of a branch circuit of an electrical distribution system.

In many applications, users desire to install one or more of the aforementioned conventional wiring devices in an outdoor space, a garage, or some other space that may be exposed to dust, moisture, insects, and/or other contaminants. Unfortunately, conventional wiring devices are not equipped to repel such things. In the event that water is applied, whether by design or by accident, a live wiring device may become a shock hazard. Conventional wiring devices have other drawbacks. Even if the moisture level does not constitute a shock hazard, corrosion may develop over time. A conventional wiring device may also degrade in a dusty environment, or be compromised by insect infestation. A conventional protective wiring device includes sensitive circuitry that makes these devices particularly vulnerable to contaminants. Protective devices such as GFCIs are often installed in the most environmentally exposed areas. For example, GFCI protection is required for outdoor receptacles, bathrooms, kitchens, basements and garages. Finally, conventional wiring devices allow air to flow between the device and the interior of the wall box. Such air drafts may compromise the energy efficiency of the structure.

In one approach that has been considered, a gasket may be inserted between the wiring device and the wall plate after the installation of the wiring device. This approach has several drawbacks. Since the installation of the gasket is left to the installer, there is no guarantee that the gasket will match the shape and form factor of the installed wiring device. In addition, there is no guarantee that the installer will properly install the gasket. In either instance, the gasket will not perform in an ideal way.

In another approach, a wiring device having a gasket ultrasonically welded between a device cover and body member has been considered. However, this approach was also found to have several drawbacks. First, while the gasket does seal the receptacle hot, neutral and ground openings from some contaminants, it is not water tight and, therefore, the device is not completely effective against momentary exposure to water. Further, because it does not provide a draft seal around the perimeter of the wall box opening, air, water, insects and dust are able to penetrate the gap between the wiring device body, the interior wall of the device wall box, and the wall plate.

What is needed therefore, is an environmentally protected wiring device that may be disposed in outdoor, or environmentally exposed areas. A device is needed that provides a durable and effective shield against dust, water, insects and other contaminants. A wiring device is further needed that effectively seals the gap between the wiring device body, the interior wall of the device wall box, and the wall plate.

SUMMARY OF THE INVENTION

The present invention addresses the needs described above by providing an environmentally protected wiring device that addresses the needs described above. The environmentally protected wiring device of the present invention may be disposed in environmentally exposed areas, whether the areas are indoors or outdoors. The environmentally protected wiring device of the present invention provides a durable and effective shield against dust, water, insects and other contaminants. The environmentally protected wiring device of the present invention effectively seals the gap between the wiring device body, the interior wall of the device wall box, and the wall plate.

One aspect of the present invention is directed to an electrical wiring device for use in an ambient environment. The device includes a cover assembly characterized by a perimeter defining a user-accessible front face portion of the wiring device. The cover assembly includes at least one user-accessible control feature disposed therein. A body member is connected to the cover assembly. A circuit arrangement is disposed in the body member, at least a portion of the circuit arrangement being in operative communication with the at least one user-accessible control feature. A gasket structure is integrated into the cover assembly and disposed under the front face portion to substantially seal the circuit arrangement from the ambient environment. The gasket structure includes at least one gasket feature coupling the at least one user-accessible control feature and the at least a portion of the circuit arrangement. The gasket structure extends from the perimeter a predetermined distance to form a gasket perimeter defining an environmentally protected area. The environmentally protected area is greater than or substantially equal to a coverage area of a standard wall plate.

In another aspect, the present invention is directed to an electrical wiring device for use in an ambient environment. The device includes a device enclosure characterized by a perimeter defining a front face portion of the device enclosure. A circuit arrangement is disposed in the device enclosure. A gasket structure is integrated into the device enclosure and disposed under the front face portion to substantially seal the circuit arrangement from the ambient environment. The gasket structure extends from the perimeter a predetermined distance to form a gasket perimeter defining an environmentally protected area. The environmentally protected area is greater than or substantially equal to a coverage area of a standard wall plate.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
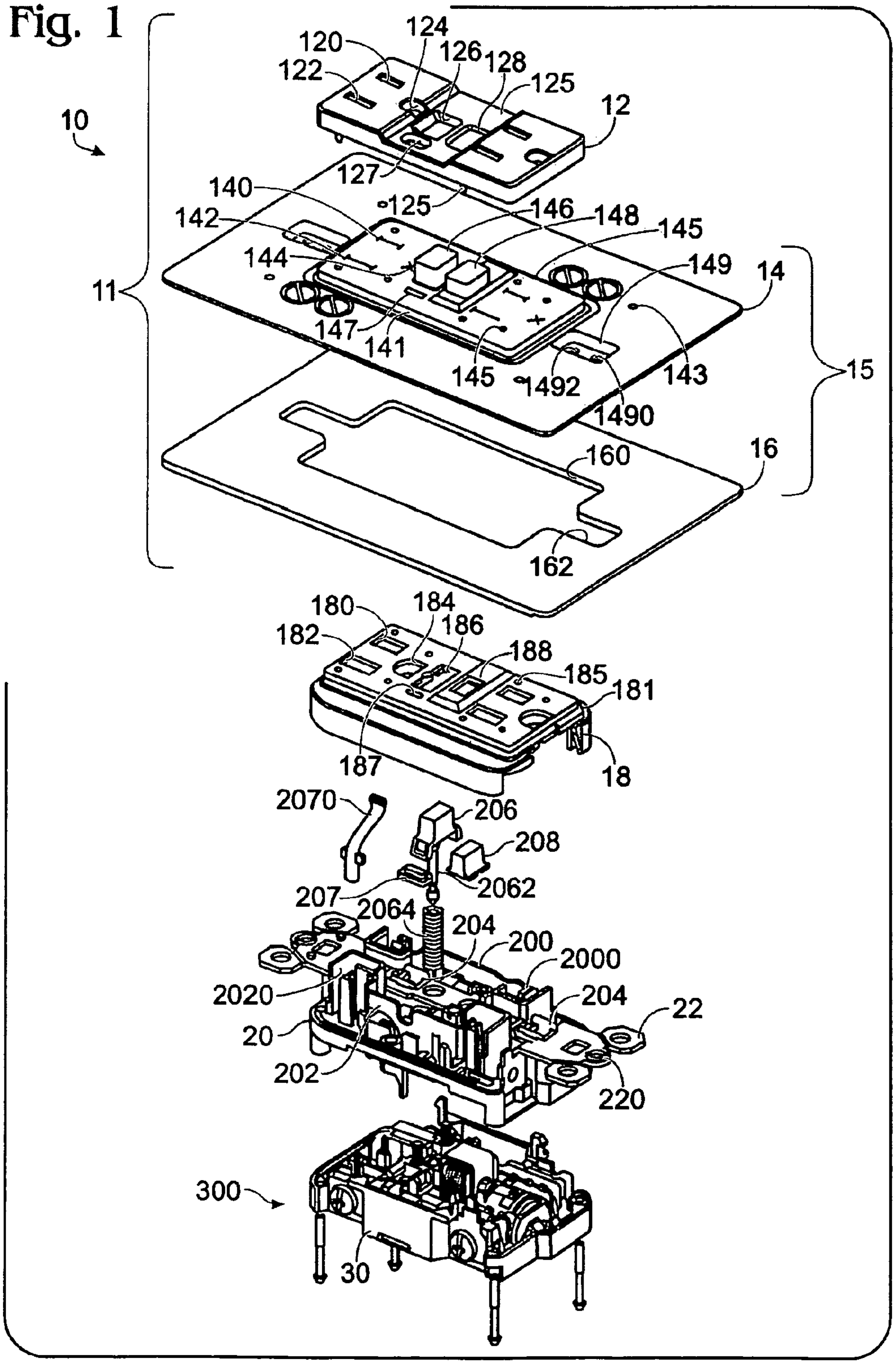
FIG. 1 is an exploded view of the environmentally protected wiring device in accordance with a first embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the wiring device of the present invention is shown in FIG. 1, and is designated generally throughout by reference numeral 10.

As embodied herein, and depicted in FIG. 1, an exploded view of the environmentally protected wiring device 10 in accordance with a first embodiment of the present invention is disclosed. The wiring device 10 includes a two-ply gasket structure 15 disposed between a front cover portion 12 and a rear cover portion 18. The gasket structure 15 includes an outer gasket 14 adhesively mated with an inner gasket member 16. A cover assembly 11 is formed when the gasket structure 15 is aligned and sandwiched between the front cover portion 12 and the rear cover portion 18. Wiring device 10 is fully assembled when the separator structure 20 is disposed between rear body member 30 and the cover assembly 11.

Referring back to the cover assembly, the front cover portion 12 includes various apertures that accommodate user-accessible control features such as buttons, light elements, receptacle apertures, etc. For example, front cover portion 12 includes a front cover hot receptacle blade aperture 120, a front cover neutral receptacle blade aperture 122, a front cover ground prong opening 124, a front cover reset button aperture 126, a front cover test button aperture 128, and a front cover lens aperture 127. The outer gasket includes analogous features that are aligned and mate with the corresponding features disposed in the front cover portion. In corresponding order, they include self-sealing hot receptacle blade slit 140, self-sealing neutral receptacle blade slit 142, a self-sealing ground prong hole 144, a reset button gasket cover 146, a test button gasket cover 148, and a lens opening 147.

The self-sealing slits prevent contaminants that have entered the openings in the front cover from entering into the wiring device interior. They are configured to open as the blades (and ground prong if provided) of a user attachable plug are inserted through the openings in the front cover. The blades (and ground prong) pass through the self-sealing slits to make electrical connection with electrical contacts disposed inside the wiring device. The wiring device is protected from contaminants since the receptacle apertures in the front cover are occupied by the plug blades. The plug housing itself may be configured to shield the receptacle openings. The self-sealing slits are configured to form a seal around the inserted edges of the plug blades (ground prong). Of course, the receptacle openings unoccupied by plug blades remain closed and protected by the self-sealing slits. After the user attachable plug is removed by the user, the self-sealing slits return to their undeformed state and seal the receptacle openings to block the entrance of contaminants.

The gasket features, in turn, mates with analogous features in the rear cover portion. Again, in corresponding order, the rear cover features include a rear cover hot receptacle blade aperture 180, a rear cover neutral receptacle blade aperture 182, a rear cover ground prong opening 184, a rear cover reset button aperture 186, a rear cover test button aperture 188, and a rear cover lens aperture 187. Apertures 180 and 182, and opening 184 are configured so as to limit the flexure of the outer gasket when the blades of a user attachable plug are inserted through the self-sealing slits. The apertures in the rear cover need not be the same size or shape as the corresponding openings in the front cover. They are simply passageways that permit the blades (and prong if provided) of the user attachable plug to enter into the wiring device to make electrical contact. The limited flexure makes it easier to insert a plug and increases the life expectancy of the gasket. The apertures may be configured to provide a secondary barrier to contaminants that happen to get inside of the outer seal.

Most of the features of gasket 14 have been explained by reference to the way it is aligned with front cover 12 and rear cover portion 18. However, the outer gasket 14 also includes a well portion 149 disposed at either end thereof. Well portion 149 has apertures 1490 formed therein for wall plate cover screws. Well portion 149 also includes mounting apertures 1492 that are aligned with screw holes 222 disposed in the mounting strap 22. Well portion 149 fits within notch 162 formed at either end of inner perimetric opening 160 of inner gasket 16.

As noted above the outer gasket 14 and the inner gasket 16 are attached by an adhesive. The adhesive is pre-applied to either or both surfaces or may be in the form of a double-sided tape. The front cover portion 12 is configured to fit over the plateau portion 141 of gasket 14. Plateau 141 corresponds to both the outer perimeter of the front face portion 12 and the inner perimeter 160 of inner gasket 16. Therefore, after the gasket structure 15 is disposed inside the front face cover 12, the plateau portion 181 of the rear cover 18 is inserted into perimetric opening 160. Posts 125 disposed in the bottom of the front face portion 12 extend through holes 145 in the gasket and mate with holes 185 disposed in the rear cover 18 to complete the cover assembly 11. Posts 125 are permanently fastened to holes 145 using a friction fit. In another method, the posts fasten to the holes using a snap fit. In another method, ends of posts 125 pass through holes 185 and are then ultrasonically staked to the rear cover. In yet another method, ends of posts 125 pass through holes 185 and are then heat-staked to the rear cover. In yet another method, ends of posts 125 pass through holes 185 and are then welded to the rear cover. In yet another method, posts 125 are replaced by threaded screws. In yet another method (not shown) posts 125 are disposed in rear cover 18 and corresponding holes 145 are disposed in front cover 12. Gasket 14 forms a seal around each post to prevent the ingress of contaminants at these locations.

The reset button 206 is inserted into aperture 186 in the rear cover portion and fits within reset gasket cover 146. The reset gasket cover 146 protrudes from front cover reset aperture 126 with the reset button 206 disposed therein. Similarly, the test button 208 is inserted into aperture 188 in the rear cover portion 18 and fits within reset gasket cover 148. The reset gasket cover 148 protrudes from front cover reset aperture 128 with the reset button 208 inside. The lens element 207 is directly disposed within the lens opening 147 formed in gasket 14. Lens element 207 is configured to fit directly over rear cover lens aperture 187. Light pipe element 2070 extends from separator 20 and fits into lens aperture 187.

Referring to separator 20, a hot contact structure 200 and a neutral contact structure 202 are disposed in non-conductive and insulating pockets formed in the separator member such that structure 200 and structure 202 do not short out. The hot contact structure 200 includes female contacts 2000 that are directly aligned with corresponding rear cover apertures 180, gasket slits 140, and front cover apertures 120. The neutral contact structure 202 includes female contacts 2020 that are directly aligned with corresponding rear cover apertures 182, gasket slits 142, and front cover apertures 122. The separator 20 also accommodates mounting strap 22, which is electrically isolated from both hot contact structure 200 and neutral contact structure 202. The mounting strap 22 includes ground contact structures 204 disposed at either end of the mounting strap 204. The ground contacts 204 are directly aligned with rear cover ground aperture 184, self-sealing gasket hole 144, and front cover ground opening 124.

Referring to body member 30, a circuit arrangement 300 is disposed therein. Of course, various parts of the circuit arrangement 300 are in operative communication with various user-accessible control features. For example, in this embodiment, circuit arrangement 300 includes ground fault circuit interrupter circuitry that includes fault sensing circuit components and fault detection components connected to a circuit interrupter assembly. Those of ordinary skill in the art will understand that when a user depresses gasket cover 148, the test button will also be depressed causing the circuit arrangement 300 to perform a test procedure. As another example, if the device is tripped, the user may press the reset button gasket cover 146 to press reset button 206. The reset button pin 2062 will be latched, causing the circuit interrupter in the circuit arrangement 300 to be reset.

Reference is made to U.S. Pat. Nos. 6,674,289, 7,068,481, and 7,154,718, which are incorporated herein by reference as though fully set forth in its entirety, for a more detailed explanation of various GFCI circuit arrangements. Those of ordinary skill in the art will also understand that the circuit arrangement of the present invention may be implemented as a single receptacle arrangement, double receptacle arrangement, AFCI arrangement, TVSS, lighting controls, night light, switch, and other suitable electrical wiring devices. Those of ordinary skill in the art will also understand that the present invention may be configured to accommodate 15 A or 20 A receptacle openings, and various other NEMA configurations.

Receptacles may be protected by a shutter mechanism. The shutter mechanism may be disposed between rear cover 18 and separator 20. Reference is made to U.S. patent application Ser. Nos. 10/729,685; 10/900,778; and 11/609,793, which are incorporated herein by reference as though fully set forth in their entirety, for a more detailed explanation of various shutter arrangements.

It will be apparent to those of ordinary skill in the pertinent art that modifications and variations can be made to outer gasket 14 of the present invention depending on cost and material selections. For example, the upper gasket 14 may be formed from various materials such as Santoprene, synthetic rubber, silicone rubber, vulcanized rubber, or foam rubber. The outer gasket 14 is selected to be much harder and durable that inner gasket 16. The Shore-A hardness value of outer gasket 14 is typically greater than 50. In one embodiment, the Shore-A hardness value of gasket 14 is about 64. The outer gasket has a thickness in a range between approximately 0.020 inches and 0.070 inches. However, the outer gasket thickness is typically in a range between approximately 0.040 inches and 0.060 inches. The thickness of the gasket covers (146,148) is typically in a range between approximately 0.020 and 0.030 inches. The reduced thickness in these regions allow the user to manipulate the buttons more easily. Referring to hot receptacle slit 140, neutral receptacle slits 142, and ground prong openings 144, the outer gasket material functions to self seal in the absence of plug blades being inserted therethrough. The inner gasket 16 has a typical thickness of approximately 0.06 inches. The inner gasket 14 is formed from a spongy closed cell foam material. The inner gasket material, being comparatively spongier, functions to seal the wiring device to the wall to which it is mounted. The inner gasket is compressed against the wall by the installed cover plate.

Outer gasket 14 may be of a noticeable color such as yellow. Outer gasket 14 may be dual molded such that a portion of the gasket is in a differing material that has a property germane to that portion, or in a different color. By way of illustration, just the gasket covers (146,148) may be molded of a clear material so as to reveal underlying label in buttons (206,208). Alternatively, gasket covers (146, 148) may be labeled in accordance with their functions. Such labels may be molded in, ink-stamped, laser cut or pad printed. Alternatively, gasket covers (146,148) may match the color of the front cover whereas the portions of the gasket that extend outside the perimeter of the cover plate may be yellow.

Figure 2:
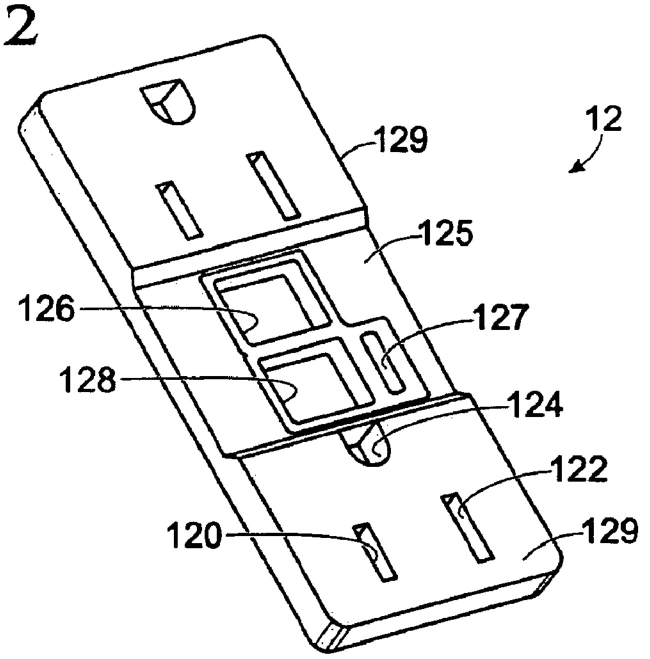
FIG. 2 is a detail view of a front portion of the cover assembly shown in FIG. 1.

Referring to FIG. 2, a detail view of the front cover portion 12 is disclosed. One feature of the present invention that has not been discussed heretofore is the recessed portion 125 of the front cover 12. The recessed portion 125 prevents the gasket covers 146, 148 from extending beyond planar surfaces 129. This feature prevents the test button 206 and the reset button 208 from being inadvertently depressed because of the degree of which the gasket covers (146, 148) extend from the apertures (126, 128) in the front cover portion 12.

Figure 3:
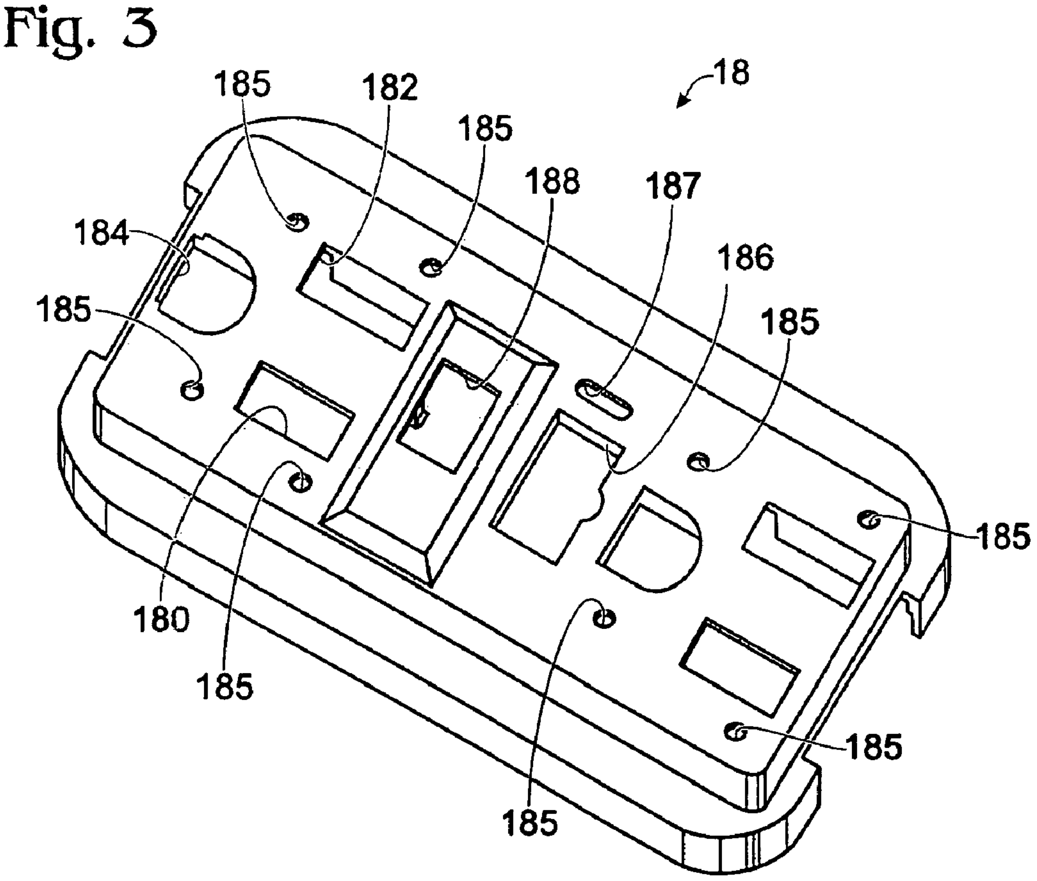
FIG. 3 is a detail view of a back portion of the cover assembly shown in FIG. 1.

FIG. 3 is a detail view of the rear cover portion shown in FIG. 1. The various feature apertures were discussed in detail above. However, this view clearly shows cover mating holes 185 laterally disposed along either side of rear cover portion 18. As noted above, posts 125 from the front cover portion extend through gasket holes 145 and mate with holes 185 to form assembly 11.

Figure 4:
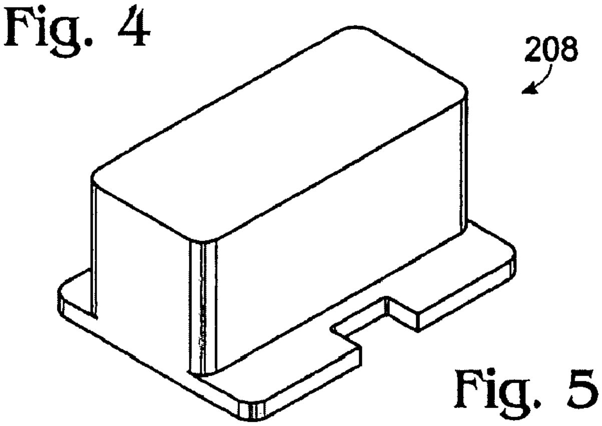
FIG. 4 is a detail view of the test button depicted in FIG. 1.
Figure 5:
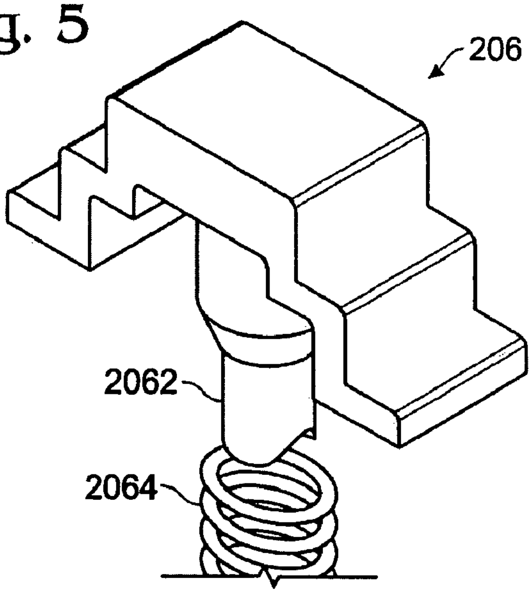
FIG. 5 is a detail view of the reset button assembly shown in FIG. 1.
Figure 6:
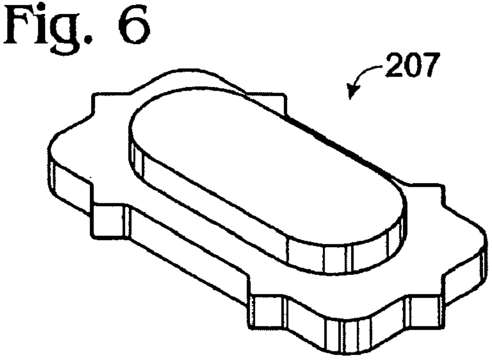
FIG. 6 is a detail view of a lens element depicted in FIG. 1.

FIG. 4 is a detail view of the test button 208 depicted in FIG. 1. FIG. 5 is a detail view of the reset button assembly 206 also shown in FIG. 1. The reset button includes a metal reset pin 2062 that mates with spring element 2064. FIG. 6 is a detail view of a lens element depicted in FIG. 1. As shown herein, the lens element 207 is disposed in gasket aperture 127. In another embodiment of the present invention, the lens element 207 is integrally formed with the outer gasket 14 by a process of dual-injection molding. Of course, the outer gasket 14 is formed of a first flexible material as described herein, and the less is formed from a second, translucent plastic material.

Figure 7:
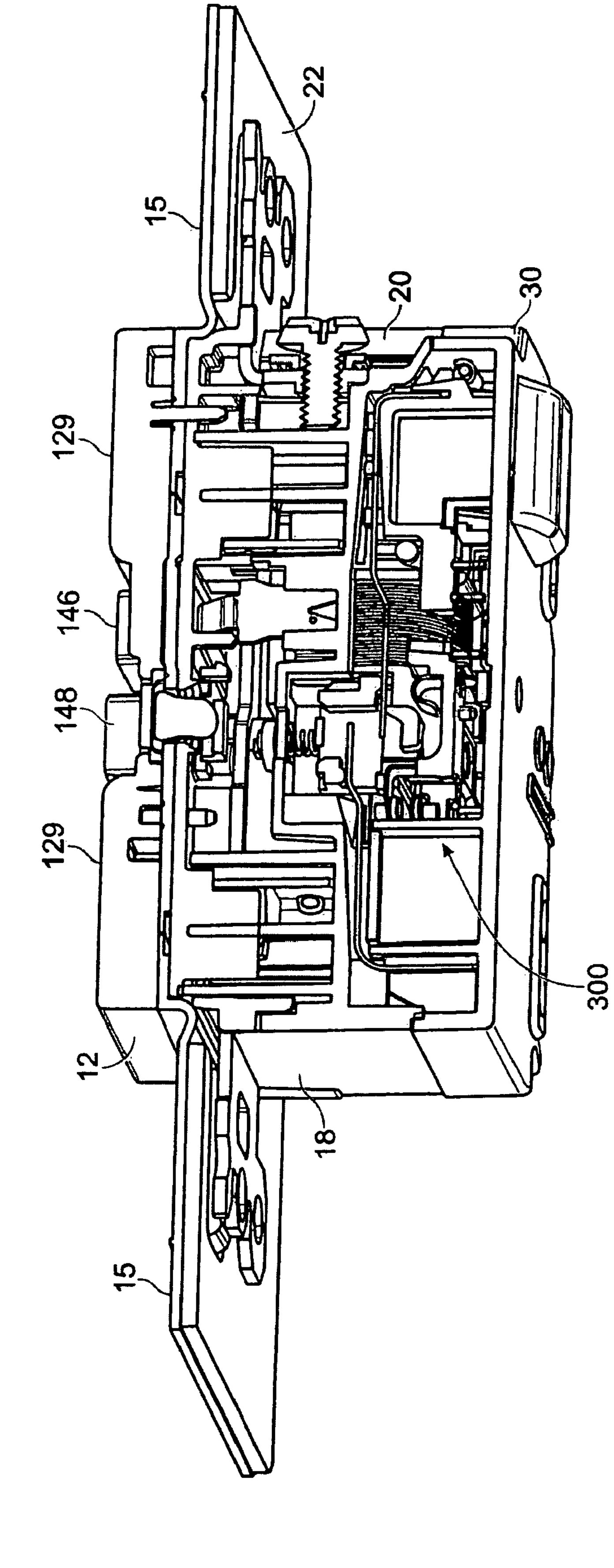
FIG. 7 is a cross-sectional view of the environmentally protected wiring device in accordance with an embodiment of the present invention.

Referring to FIG. 7, a cross-sectional view of the environmentally protected wiring device 10 depicted in FIG. 1 is shown. The test button 206 disposed in gasket cover 146 and the reset button 208 disposed in gasket cover 148 do not extend past surfaces 129. FIG. 7 illustrates how the front cover portion 12, gasket structure 15, and rear cover portion 18 mate together to effectively seal circuit structure 300 within body member 30 such that contaminants in the ambient environment cannot penetrate the interior portion of device 10.

Figure 8B:
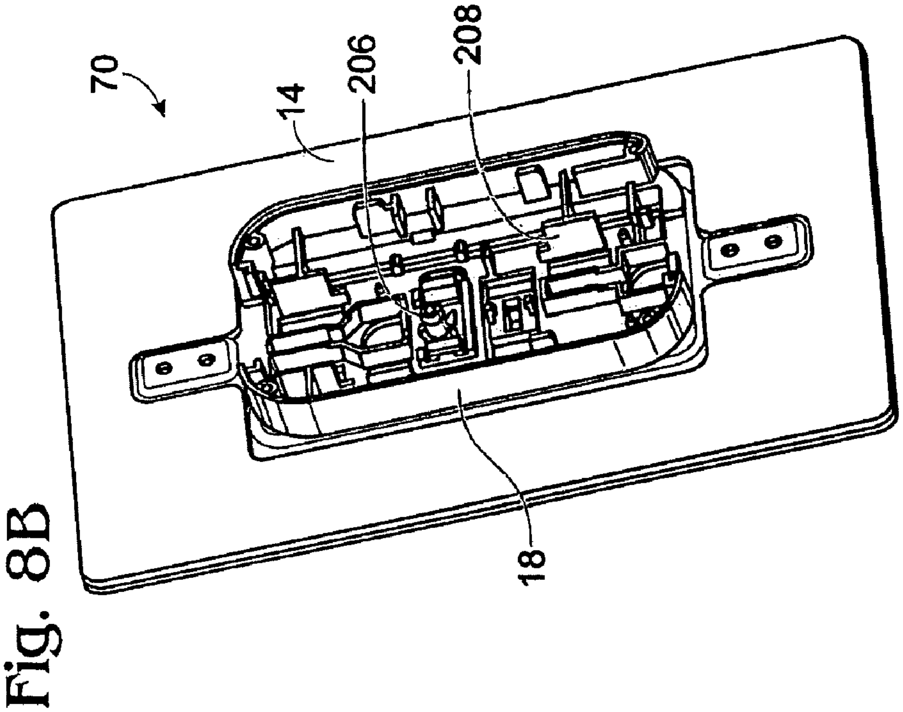
FIG. 8B is a rear view of the environmentally protected wiring device in accordance with a second embodiment of the present invention.
Figure 8A:
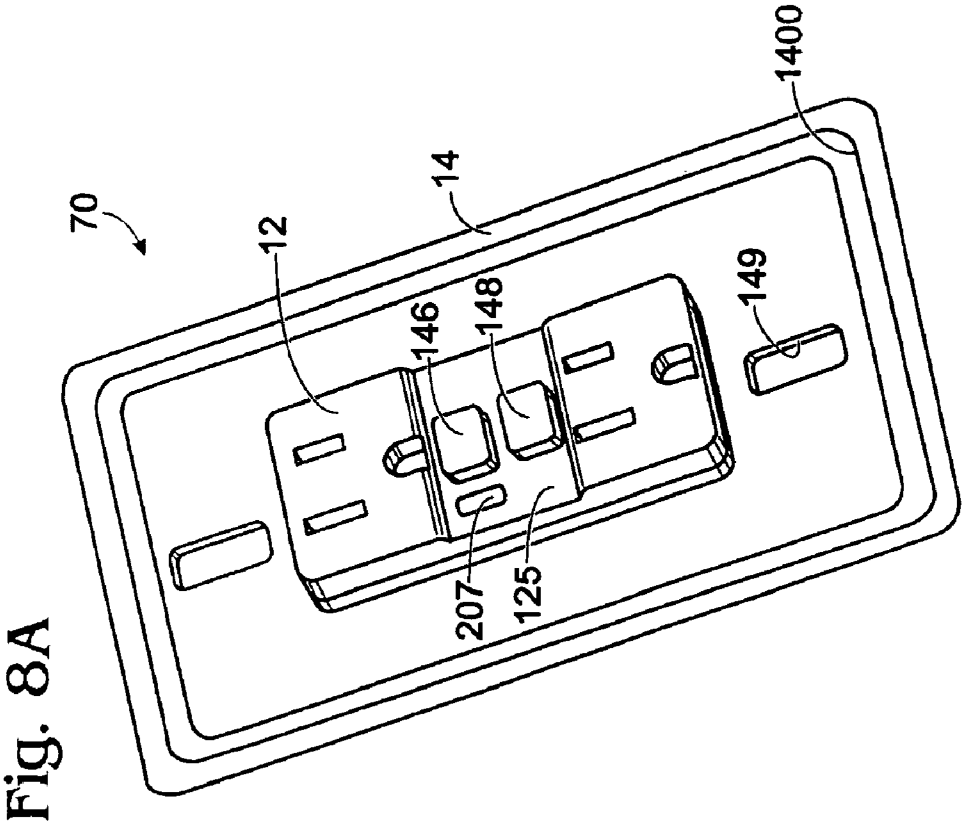
FIG. 8A is a frontal view of the environmentally protected wiring device in accordance with a second embodiment of the present invention.

As embodied herein and depicted in FIG. 8A, a frontal view of the environmentally protected wiring device 10 in accordance with a second embodiment of the present invention is disclosed. FIG. 8B is a rear view of the environmentally protected wiring device 10 shown in FIG. 8A. The construction of the front face cover 12, the rear cover portion 18, separator 20 (not shown), and body member 30 (not shown) are identical to the construction of the first embodiment discussed in detail above. The second embodiment shown in FIGS. 8A-8B differs from the first embodiment (FIGS. 1-7) in that a one-ply gasket structure 14 is employed instead of a two-ply structure. In this embodiment, the gasket structure 14 includes a series of rippled corrugated portions 1400 that are disposed around a perimetric edge of gasket 14. The purpose of the corrugated ripples is discussed below in conjunction with FIGS. 9-10.

Gasket 14 is similar to the inner gasket 14 depicted in the first embodiment. It may be formed from various materials such as Santoprene, synthetic rubber, silicone rubber, vulcanized rubber, or foam rubber. Gasket 14 may have a Shore-A hardness value of outer gasket 14 that is typically greater than 50. In one embodiment, the Shore-A hardness value is about 64. Gasket 14 has a thickness in a range between approximately 0.020 inches and 0.070 inches. The thickness is typically in a range between approximately 0.040 inches and 0.060 inches. Again, the inner gasket material functions to self seal in the absence of plug blades being inserted into hot receptacle slits 140, neutral receptacle slits 142, and ground prong openings 144.

Figure 9:
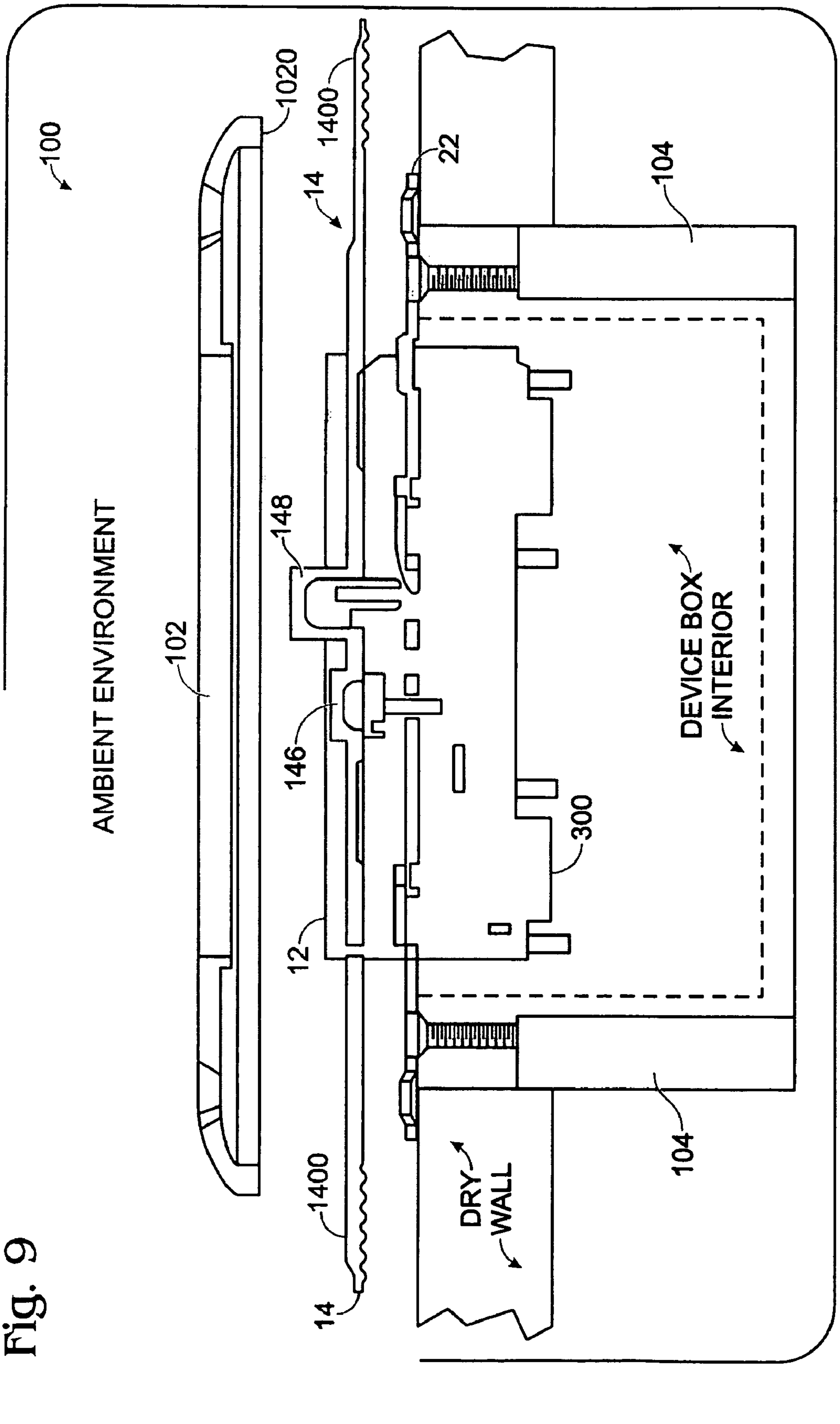
FIG. 9 is a cross-sectional view of the environmentally protected wiring device depicted in FIG. 8A and FIG. 8B.

Referring to FIG. 9, a cross-sectional view of the environmentally protected wiring device depicted in FIG. 8A and FIG. 8B is shown. This view shows wiring device 10 being installed in wall box 104. The distance between gasket 14 and mounting strap 22 is exaggerated in this view for clarity of illustration. The ground strap 22 is typically a snug fit in the manner shown in FIG. 7. Once device 10 is mounted to wall box 104, cover plate 102 is connected to the mounting strap 22. The edges 1020 of the wall plate 102 fit within one of the valleys 1402 (See FIG. 10) formed by corrugations 1400 to effectively seal both device 10 and wall box 104 from the ambient environment.

Figure 10:
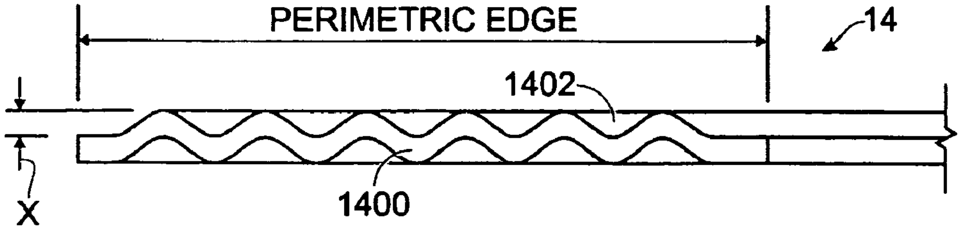
FIG. 10 is a detail view of the gasket structure shown in FIG. 9.

FIG. 10 is a detail view of the gasket structure shown in FIGS. 8-9. Again, corrugated portions 1400 form undulating valleys 1402 in gasket 14. The corrugation is aligned with respect to edges 1020 of cover plate 102. When the cover plate is installed, its edges compress the corrugation against the wall to which the wiring device is mounted to form an environmental seal. Corrugated portions 1400 need only include a single ripple. Additional ripples may be included to provide a better environmental seal or to accommodate a family of wall plate sizes. The thickness of the corrugated portions 1400 is in an approximate range between 0.040 and 0.060 inches. The corrugated portions 1400 typically extend from the surface of the gasket structure a distance "X" in an approximate range between 0.030 and 0.060 inches.

Figure 11:
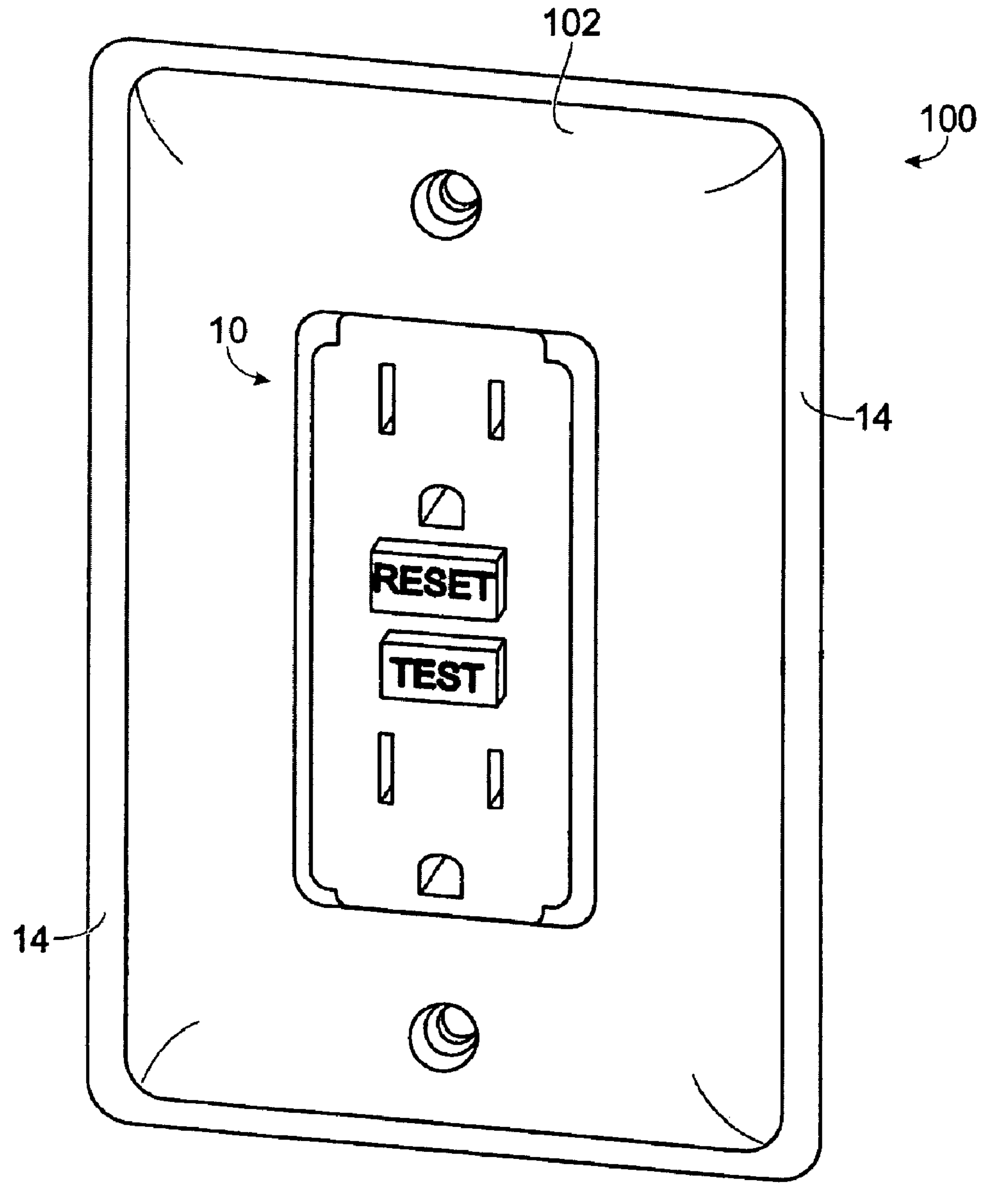
FIG. 11 is a front view of the environmentally protected wiring device as installed and covered by a wall plate in accordance with the present invention.

Referring to FIG. 11, a front view of the environmentally protected wiring device 10 as installed and covered by a wall plate 102 in accordance with the present invention is disclosed. This view is equally applicable to either embodiment. As shown, the gasket structure 14 extends beyond the coverage area of the standard wall plate. As those of ordinary skill in the art will appreciate, the standard wall plate 102 has dimensions approximately equal to 2.92 inches by 4.66 inches. As shown, gasket 14 provides an environmentally protected coverage area of approximately 3.30 inches by 5.05 inches. Of course, those of ordinary skill in the art will also appreciate that the present invention is applicable to multi-gang wall box arrangements as well.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device for use in an ambient environment, the device comprising:

a cover assembly characterized by a perimeter defining a user-accessible front face portion of the wiring device, the cover assembly including at least one user-accessible control feature disposed therein;

a body member connected to the cover assembly;

a circuit arrangement disposed in the body member, at least a portion of the circuit arrangement being in operative communication with the at least one user-accessible control feature; and a gasket structure integrated into the cover assembly and disposed under the front face portion to substantially seal the circuit arrangement from the ambient environment, the gasket structure including at least one gasket feature coupling the at least one user-accessible control feature and the at least a portion of the circuit arrangement, the gasket structure extending from the perimeter a predetermined distance to form a gasket perimeter defining an environmentally protected area, the environmentally protected area being greater than or substantially equal to a coverage area of a standard wall plate.

2. The device of claim 1, wherein the gasket structure is a one-ply gasket.

3. The device of claim 1, wherein the gasket structure includes a rippled corrugated portion including at least one ripple disposed substantially around the gasket perimeter and in parallel to the gasket perimeter.

4. The device of claim 3, wherein a thickness of the gasket structure comprising the corrugated portions is in an approximate range between 0.040 and 0.060 inches.

5. The device of claim 3, wherein the corrugated portions extend from a surface of the gasket structure a distance in an approximate range between 0.030 and 0.060 inches.

6. The device of claim 1, wherein the standard wall plate has dimensions approximately equal to 2.92 inches by 4.66 inches.

7. The device of claim 1, wherein the environmentally protected area is approximately 3.30 inches by 5.05 inches.

8. The device of claim 1, wherein a user accessible surface of the gasket structure is yellow in color.

9. The device of claim 1, wherein at least one label is disposed on a user accessible surface of the gasket structure.

10. The device of claim 1, wherein the gasket structure further comprises:

an outer gasket formed from a first material characterized by a first Shore-A hardness value; and a inner gasket disposed on an underside of the upper gasket, the lower gasket having a second Shore-A hardness value lower than the first Shore-A hardness value.

11. The device of claim 10, wherein the upper gasket is formed from a material selected from a group of materials that includes Santoprene, synthetic rubber, silicone rubber, vulcanized rubber, or foam rubber.

12. The device of claim 10, wherein the first Shore-A hardness value is greater than 50.

13. The device of claim 12, wherein the first Shore-A hardness value is substantially equal to about 65.

14. The device of claim 10, wherein the upper gasket has a thickness in a range between approximately 0.020 inches and 0.070 inches.

15. The device of claim 14, wherein the upper gasket has a thickness in a range between approximately 0.040 inches and 0.060 inches.

16. The device of claim 10, wherein the lower gasket has a thickness of approximately 0.06 inches.

17. The device of claim 10, wherein the lower gasket is formed from a closed cell foam material.

18. The device of claim 1, wherein the circuit arrangement includes a ground fault circuit interrupter arrangement, the at least one user-accessible control feature including at least one button aperture, and the at least one gasket feature including a button-shaped gasket portion configured to be disposed inside the at least one button aperture and accessible via the front face portion.

19. The device of claim 18, wherein the circuit arrangement includes a test button operatively connected to the ground fault circuit interrupter arrangement, the test button being configured to be inserted into the button-shaped gasket portion.

20. The device of claim 18, wherein the circuit arrangement includes a reset button operatively connected to the ground fault circuit interrupter arrangement, the reset button being configured to be inserted into the button-shaped gasket portion.

21. The device of claim 18, wherein the at least one button aperture is disposed in a central portion of the user-accessible front face portion, the central portion being substantially recessed from adjacent portions of the user-accessible front face portion such that the button-shaped gasket portion is also recessed from the adjacent portions.

22. The device of claim 1, wherein the circuit arrangement includes at least one set of user-accessible receptacle load contacts, the at least one user-accessible control feature including at least one set of user-accessible receptacle apertures, and the at least one gasket feature including a set of self-sealing holes disposed between the at least one set of user-accessible receptacle load contacts and the at least one set of user-accessible receptacle apertures.

23. The device of claim 22, further including a shutter mechanism having a closed position and an open position that either blocks or permits user access to the receptacle load contacts, wherein the shutter remains closed when a user-insertable foreign object is inserted through a receptacle aperture but opens in response to the insertion of user attachable electrical plug blades through the receptacle apertures.

24. The device of claim 1, wherein the circuit arrangement includes a light emitting circuit arrangement having at least one light emitting element connected thereto, the at least one user-accessible control feature including at least one lens aperture, and the at least one gasket feature including at least one lens element formed therein, the at least one lens element being disposed inside the at least one lens aperture and accessible via the front face portion.

25. The device of claim 24, further comprising a light pipe operatively connected between the at least one light emitting element and the at least one lens element.

26. The device of claim 1, wherein the environmentally protected area is greater than a coverage area of a multi-gang device wall box.

27. The device of claim 1, wherein the gasket structure includes an upper recessed well portion and a lower recessed well portion, each of which are substantially disposed along a device centerline, each recessed well portion including self-sealing holes configured to accommodate device box screws.

28. The device of claim 1, wherein the gasket structure includes an upper recessed well portion and a lower recessed well portion, each of which are substantially disposed along a device centerline, each recessed well portion including self-sealing holes configured to accommodate device wall plate screws.

29. The device of claim 1, wherein the circuit arrangement is selected from a group of circuit arrangements that includes GFCIs, AFCIs, TVSSs, receptacles, duplex receptacles, night-lights, decorator receptacles, sensors or switches.

30. The device of claim 1, wherein the cover assembly further comprises:

a front cover portion having the user-accessible front face portion disposed thereon and including at least one user-accessible control feature aperture disposed in the front face portion, the gasket structure being disposed under the front cover portion such that the at least one gasket feature is disposed in the at least one user-accessible control feature aperture; and a rear cover portion including at least one rear cover control feature aperture disposed in alignment with the at least one gasket feature and the at least a portion of the circuit arrangement.

31. The device of claim 30, wherein a portion of the gasket structure is sandwiched between the rear cover portion and the front cover portion by way of an attachment structure.

32. The device of claim 31, wherein the attachment structure includes a plurality of pins associated with the front cover that mate with corresponding attachment structures associated with the rear cover.

33. The device of claim 32, wherein the attachment structure includes a plurality of pins associated with the rear cover that mate with an attachment structure associated with the front cover.

34. The device of claim 31 wherein the circuit arrangement further includes receptacle load contacts accessible to the user by way of receptacle apertures disposed on the front face portion, further including a shutter mechanism having a closed position and an open position that either blocks or permits user access to the receptacle load contacts, wherein the shutter remains closed when a user-insertable foreign object is inserted through a receptacle aperture but opens in response to the insertion of user attachable electrical plug blades through the receptacle apertures.

35. The device of claim 34, wherein the shutter mechanism is disposed between the rear cover and the receptacle load contacts.

36. An electrical wiring device for use in a wall box disposed in an ambient environment, the device comprising: a device housing including a cover assembly connected to a rear body member, the cover assembly being characterized by a perimeter defining a front face portion of the device housing; the cover assembly including at least one user-accessible control feature disposed on a front face portion; a mounting strap disposed between the cover assembly and the rear body member, the mounting strap including a plurality of mounting portions configured to attach the electrical wiring device to the wall box; a circuit arrangement disposed in the device housing; the circuit arrangement being coupled to the at least one user-accessible control feature; and a gasket structure integrated into the cover assembly and disposed under the front face portion to substantially seal the circuit arrangement from the ambient environment, the gasket structure extending from the perimeter a predetermined distance to form a gasket perimeter defining an environmentally protected area, the environmentally protected area being greater than or substantially equal to a coverage area of a standard wall plate.

37. The device of claim 36, wherein the circuit arrangement is disposed in the rear body member and at least a portion of the circuit arrangement is in operative communication with the at least one user-accessible control feature.

38. The device of claim 37, wherein the gasket structure includes at least one gasket feature that operatively couples the at least one user-accessible control feature to the at least a portion of the circuit arrangement.

39. The device of claim 36, wherein the gasket structure is a one-ply gasket.

40. The device of claim 36, wherein the gasket structure includes a series of rippled corrugated portions disposed substantially around the gasket perimeter and in parallel to the gasket perimeter.

41. The device of claim 40, wherein a thickness of the gasket structure comprising the rippled corrugated portions is in an approximate range between 0.040 and 0.060 inches.

42. The device of claim 40, wherein the rippled corrugated portions extend from a surface of the gasket structure a distance in an approximate range between 0.030 and 0.060 inches.

43. The device of claim 36, wherein the environmentally protected area is approximately 3.30 inches by 5.05 inches.

44. The device of claim 36, wherein the gasket structure further comprises:

an outer gasket formed from a first material characterized by a first Shore-A hardness value; and an inner gasket disposed on an underside of the outer gasket, the inner gasket having a second Shore-A hardness value lower than the first Shore-A hardness value.

45. The device of claim 44, wherein the outer gasket is formed from a material selected from a group of materials that includes Santoprene, synthetic rubber, silicone rubber, vulcanized rubber, or foam rubber.

46. The device of claim 44, wherein the outer gasket has a thickness in a range between approximately 0.020 inches and 0.070 inches.

47. The device of claim 46, wherein at least a portion of the outer gasket has a thickness in a range between approximately 0.040 inches and 0.060 inches.

48. The device of claim 44, wherein the inner gasket has a thickness of approximately 0.06 inches.

49. The device of claim 44, wherein the inner gasket is formed from a closed cell foam material.

50. The device of claim 36, wherein the rear body member is configured to sandwich a portion of the gasket structure against an interior surface of the front face portion.

51. The device of claim 50, wherein a plurality of pins are disposed on the front face portion that align with corresponding attachment structures disposed in the rear body member.

* * * * *

UNITED STATES PATENT AND TRADEMARK OFFICE

CERTIFICATE OF CORRECTION

PATENT NO. : 7,554,033 B1
APPLICATION NO. : 11/677208
DATED : June 30, 2009
INVENTOR(S) : Bhosale et al.

It is certified that error appears in the above-identified patent and that said Letters Patent is hereby corrected as shown below:

Please correct the typographical error as follows:

Column 10, claim 10, line 7, reads “a inner gasket”

Please delete the word “a” and insert the word -- an -- such that column 10, claim 10, line 7 reads:

-- an inner gasket --

Signed and Sealed this

Third Day of November, 2009

David J. Kappos

David J. Kappos
*Director of the United States Patent and Trademark Office*